(No Model.)
W. W. GRISCOM.
METHOD OF DISTRIBUTING ELECTRICITY BY SECONDARY BATTERIES.
No. 404,968. Patented June 11, 1889.
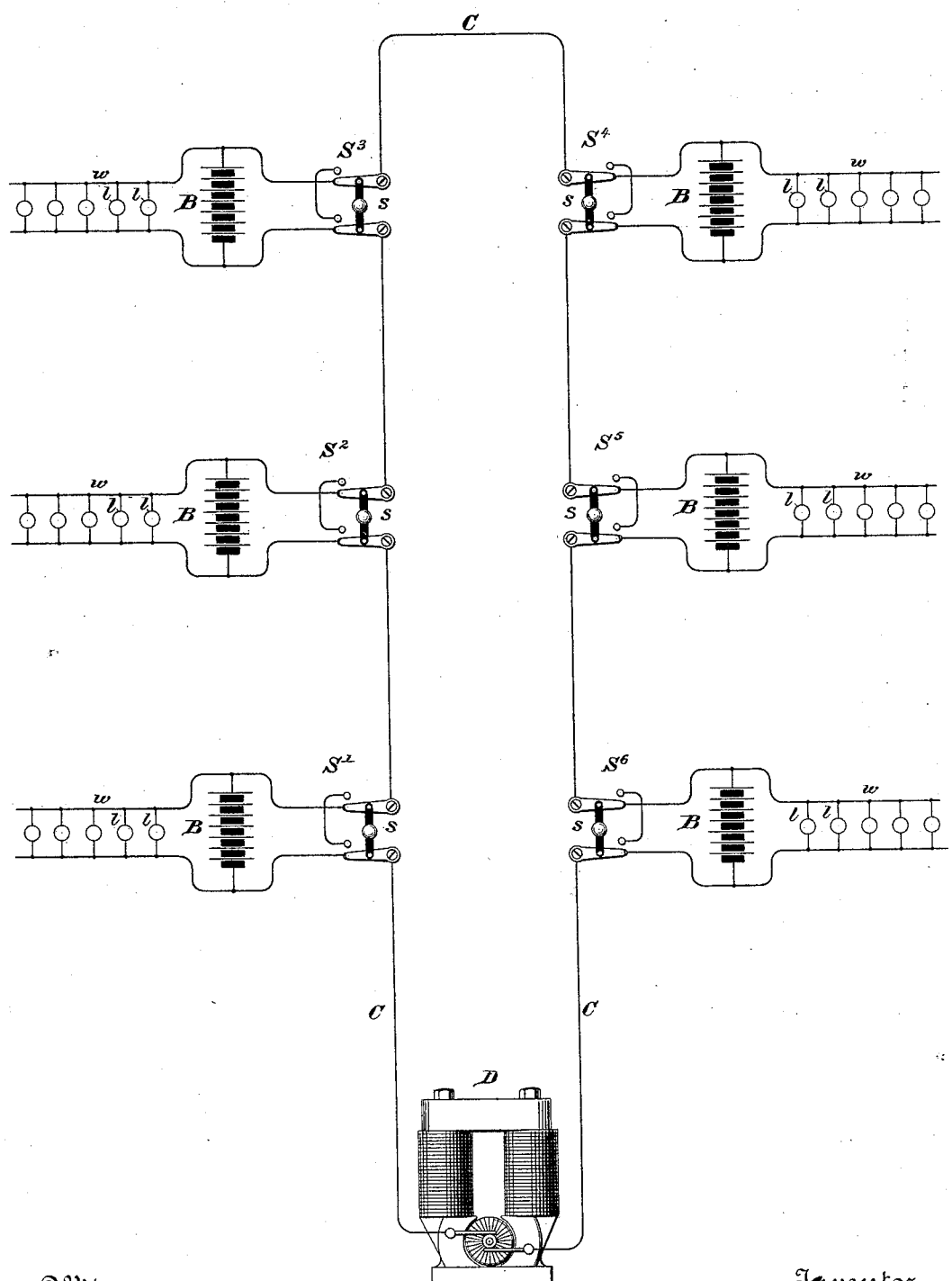
Witnesses
Geo. W. Breck.
Edward Thorpe.
Inventor
William W. Griscom
By his Attorney
Wm. B. Vansize

United States Patent Office.

WILLIAM W. GRISCOM, OF HAVERFORD COLLEGE, ASSIGNOR TO THE ELECTRO DYNAMIC COMPANY, OF PHILADELPHIA, PENNSYLVANIA.

METHOD OF DISTRIBUTING ELECTRICITY BY SECONDARY BATTERIES.

SPECIFICATION forming part of Letters Patent No. 404,968, dated June 11, 1889.

Application filed February 1, 1889. Serial No. 298,337. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in the Method of Distributing Electricity by the Storage System, of which the following is a specification.

My invention is an improvement in the method of distributing electricity by the storage system.

Others have heretofore placed a dynamo-machine at or near a suitable source of power, and have connected such dynamo with a secondary battery located at a greater or less distance therefrom, and near the point where the electric energy was to be utilized. The battery was first charged from the dynamo. The dynamo was then disconnected and a working-circuit containing translating devices—such as glow-lamps—was connected to the battery until the battery was exhausted. As an economical distributing system this was meritorious, but susceptible of improvement, for after the battery was charged the dynamo, its prime motor, and the charging-circuit were idle for a considerable time, and as all batteries have a discharge rate beyond which it is undesirable to draw current from them a limit to the number and character of the translating devices was soon reached.

My improved method of distribution consists in generating electricity at or near a convenient source of power, conveying it to the point of consumption through the medium of a current of low intensity, storing it in the form of chemical potential, as in a secondary battery, and then simultaneously directing the current from both primary generator and storage system into a working-circuit containing translating devices—such as lamps—by which means the generating-plant is or may be continuously operated, and the number or character of the translating devices as regards the consumption of energy thereby may be greatly increased.

The accompanying drawing illustrates an arrangement of apparatus employed in practicing my improved method of distribution.

D is a primary generator of electricity, as a dynamo-electric machine. It is located at or near a suitable source of power, as a steam-engine or water-wheel.

$S'$ to $S^6$ are sub-stations some distance from the dynamo D and from each other. At each station $S'$ to $S^6$ there is located a device or apparatus for storing electric energy electro-chemically, such as a secondary battery B.

C is a conductor of comparatively small gage for conveying electric energy from the dynamo D to the sub-stations $S'$ $S^2$, &c., in the form of a so-called "current" of a comparatively high electro-motive force and comparatively low intensity. All the batteries B are connected to the circuit C. At each sub-station there is a working-circuit $w$, containing translating devices, as lamps $l$. This circuit is connected to the battery B and to the conductor C. Switches $s$ are placed at each sub-station for disconnecting conductor C from the sub-station. The translating devices in the sub-station circuits $w$, by reason of their number and capacity, absorb electric energy at a greater rate or intensity than battery B can supply operating alone, or greater than conductor C can carry; but by operating dynamo D during the periods of least consumption in the circuits $w$ the batteries B can be charged, and during the periods of greater consumption batteries B, operating in conjunction and simultaneously with dynamo D, are capable of supplying the maximum intensity of current required at any or all sub-stations. There is, therefore, a great saving in the weight of copper in the conductor C, and the dynamo, with its prime motor and accompanying apparatus, is profitably utilized more constantly or for a much longer time than has heretofore been the case.

What I claim, and desire to secure by Letters Patent, is—

1. The improved method of distributing electricity herein described, which consists in generating electricity at or near a suitable source of power, conveying it to the point of consumption through the medium of a current of comparatively-low intensity, there storing it in the form of chemical energy, as in a secondary battery, and then simultaneously directing the current from said generator and storage apparatus into a working-circuit containing translating devices consuming current at a rate exceeding the capacity of the storage apparatus alone, substantially as described.

2. The improvement in the method of distributing electricity herein described, which consists in generating electricity at or near a suitable source of power, conveying it to two or more widely-separated points of consumption through the medium of a current of comparatively-low intensity, there storing it in the form of chemical energy, as in secondary batteries, and then simultaneously directing the current from said generator and storage apparatus into working-circuits containing translating devices consuming current at a rate exceeding the capacity of the storage apparatus alone, substantially as described.

3. The method of distributing electricity herein described, which consists in generating electricity at or near a central point or station, conveying it to the point of consumption through the medium of a current of comparatively-low intensity, there storing it in the form of chemical energy, as in a secondary battery, and then simultaneously directing the current from said generator and storage apparatus into a working-circuit containing translating devices consuming current at a rate exceeding the capacity of either generator or storage apparatus when alone connected thereto, substantially as described.

WILLIAM W. GRISCOM.

Witnesses:
DANIEL E. DELAVAN,
V. E. SCHAUMBURG.